(12) United States Patent
Ratmanski et al.

(10) Patent No.: US 8,559,611 B2
(45) Date of Patent: Oct. 15, 2013

(54) AUDIO SIGNAL ROUTING

(75) Inventors: Kiril Ratmanski, Santa Clara, CA (US);
Richard J. Kos, Haverhill, MA (US);
Erwin Goesnar, Daly City, CA (US);
Eric David Elias, Somerville, MA (US);
Venugopal Kalluri, San Jose, CA (US)

(73) Assignee: Polycom, Inc., San Jose, CA (US)

( * ) Notice: Subject to any disclaimer, the term of this patent is extended or adjusted under 35 U.S.C. 154(b) by 1531 days.

(21) Appl. No.: 12/099,144

(22) Filed: Apr. 7, 2008

(65) Prior Publication Data

US 2009/0252315 A1     Oct. 8, 2009

(51) Int. Cl.
 *H04M 3/42*  (2006.01)
 *H04M 11/00* (2006.01)
 *H04M 1/00*  (2006.01)
 *H04L 12/16* (2006.01)
 *H04Q 11/00* (2006.01)
 *H04N 7/14*  (2006.01)

(52) U.S. Cl.
 USPC ............ 379/202.01; 379/93.21; 379/158; 370/260; 455/16; 348/14.08

(58) Field of Classification Search
 USPC ........... 379/93.21, 202.01, 203.01–206.01, 379/388.02, 158, 90.01, 93.01, 157, 201.01, 379/207.01; 370/260, 259, 261, 262; 455/416, 414.1; 348/14.01, 14.02, 348/14.03, 14.04, 14.05, 14.06, 14.07, 348/14.08, 14.09, 14.1, 14.11, 14.12, 14.13, 348/14.14, 15.15, 14.16
 See application file for complete search history.

(56) References Cited

U.S. PATENT DOCUMENTS

| 6,115,465 A * | 9/2000 | Hardy ........................... 379/386 |
| 7,006,617 B1 * | 2/2006 | Dal Farra et al. ......... 379/206.01 |
| 2003/0026441 A1 * | 2/2003 | Faller ............................. 381/98 |
| 2004/0175006 A1 * | 9/2004 | Kim et al. ...................... 381/92 |
| 2008/0091415 A1 * | 4/2008 | Schafer ...................... 704/200.1 |
| 2009/0052643 A1 * | 2/2009 | Hupp et al. ................ 379/93.21 |

* cited by examiner

*Primary Examiner* — Khai N Nguyen
(74) *Attorney, Agent, or Firm* — Wong, Cabello, Lutsch, Rutherford & Brucculeri, L.L.P.

(57) ABSTRACT

A communication system that includes multiple conferencing devices connected in a daisy-chain configuration is communicably connected to far-end conference participants. Multiple conferencing devices provide improved sound quality to the far-end participants by reducing aural artifacts resulting from reverberation and echo. The daisy-chain communication system also reduces the processing and transmission time of the near-end audio signal by processing and transmitting the audio signal in frequency domain. Each conferencing device in the daisy chain performs signal conditioning on its audio signal before transmitting it in the frequency domain to a mixer. The output signal of the mixer is converted back to the time domain before being transmitted to the far-end. The daisy-chain configuration also provides a distributed bridge to external communication devices that can be connected to each conferencing device.

33 Claims, 7 Drawing Sheets

AUDIO SIGNAL ROUTING

BACKGROUND OF THE INVENTION

1. Field of the Invention

The present invention relates generally to conferencing systems, and more particularly to daisy chained conferencing systems.

2. Description of the Related Art

Table-top conferencing systems have become an increasingly popular and valuable business communications tool. These systems facilitate rich and natural communication between persons or groups of persons located remotely from each other, and reduce the need for expensive and time-consuming business travel.

In conventional conferencing systems, a single conferencing device is located at each site, for example, inside a conference room. Participants gather around the conferencing device to speak into a microphone and to hear the far-side participant on a loudspeaker. The acoustic properties of the conference room play an important part in the reception and transmission of audio signals between the near-end and the far-end participants. Reverberation is one of several undesirable physical phenomena degrade inter-device communications.

Reverberation is caused by the existence of multiple paths of multiple lengths between the sound source and the sound receiver. The multiple paths are formed due to reflections from the internal surfaces of the room and the objects enclosed therein. For example, in addition to the direct path from the source to the receiver, there may be paths formed by the sound reflecting from each of the six internal surfaces of a room. The auditory consequence of this phenomenon is experienced when the sound of a source persists for a certain amount of time even after the source is cut off. Reverberation's impact on speech is felt when the reverberation of a first syllable persists long enough to overlap with the subsequent second syllable, possibly making the second syllable incomprehensible. One way to reduce reverberations is to cover the reflective surfaces inside the room with materials having high absorption coefficient. However, this is expensive and may not be feasible when the portability of the conferencing devices is taken into account.

A single conferencing device may provide only one or three microphones to receive the voices of all the participants. This exacerbates the reverberation problem. Microphone pods may be connected to the main speakerphone, thus allowing microphones to be closer to the speakers—somewhat alleviating the reverberation problem.

Further, a single conferencing device generally provides only a single loudspeaker at a single location. If the distribution of positions of participants is uneven with respect to the position of the conferencing device, the participants farthest from the device may hear the sound of the loudspeaker at a much lower level than the participants nearer to the device. This non-uniform sound distribution puts undue constraints on the positions of the participants. In some scenarios, where the conference device is operated in a large room or auditorium, the non-uniform sound distribution may render the sound from the loudspeaker imperceptible, or even inaudible, to some participants. The microphone pods used above to reduce reverberation problems do nothing to address this problem.

Furthermore, a single conferencing device generally provides only a single location to control the operation of the conferencing device. The user interface mounted on the conferencing device may not be easily accessible to participants that are positioned far away from the conferencing device. For example, functions like dialing, muting, volume, etc., which may be quite frequently used by the participants, may not be easily accessible to all participants. This lack of ease in accessing the user control functions on the conferencing device may also put constraints on the positions of the participants.

*Certain conferencing devices may act as a bridge to allow simultaneous connectivity to multiple communication devices. *One or more communication devices, when connected to a bridge, transmit and receive audio signals to each other via the bridge. The bridge is required to process the audio signals associated with each communication device participating in the conference. The processing typically includes mixing, audio conditioning, amplification, etc. With large number of communication devices, the processing may require higher bandwidth and lower processing latency that that provided by a single conferencing device acting as a bridge. As a result, bridges are generally relatively expensive devices. One could attempt to combine many different locations by having a number of participants act as small bridges using three-way conference calling features commonly available on office PBX systems. However, this is difficult to coordinate and usually results in very uneven speaker levels.

It would be desirable to provide a system to provide better loudspeaker distribution with minimal reverberation problems. It would also be desirable to provide satisfactory bridging capability at a lower cost than conventional bridges.

SUMMARY

A conferencing system is disclosed that includes a plurality of near-end conferencing devices connected in a daisy chained configuration. One of the near-end conferencing devices is selected as the primary conferencing device. All near-end conferencing devices capture the voices of a plurality of near-end participants and convert them into audio signals. Each non-primary conferencing device transmits its audio signal in the frequency domain, via the daisy chain, to the primary conferencing device. The primary conferencing device mixes the frequency domain audio signals received from each non-primary conferencing device to generate a single near-end frequency domain audio signal. The near-end frequency domain audio signal is then converted into a time domain near-end audio signal and is transmitted to the far-end. Alternatively, a non-primary device can be connected to the far-end conferencing device. This means that the single near-end frequency domain audio signal is transmitted from the primary device that carries out the mixing to the non-primary device, which, in turn, converts the near-end frequency domain audio signal into a near-end time domain audio signal. This near-end time domain audio signal is then transmitted to the far-end conferencing device.

In a preferred embodiment the primary conferencing device receives a time domain far-end signal from the far-end conferencing device. The primary conferencing device processes this incoming far-end signal and generates a time domain loudspeaker signal. The processing can include mixing, gain adjustments, volume control, etc. This loudspeaker signal is distributed to each non-primary conferencing device in the time domain. The conferencing system is adapted to delay loudspeaker signal corresponding to each conferencing device such that the playback at each near-end conferencing device is substantially simultaneous.

Multiple near-end conferencing devices provide multiple voice pickup points. The conferencing devices can be placed such that the distance between the voice source and the conferencing device is minimized. The proximity to the voice sources reduces aural artifacts resulting from reverberation and reduces the aural artifacts in the picked-up voice signal. The number of near-end conferencing devices in the daisy chain and their respective spatial distribution is selected to optimize sound pickup quality.

Multiple near-end conferencing devices provide multiple loudspeakers. The conferencing devices can be placed such that the far-end audio can be more uniformly distributed among the near-end participants. Thus, the far-end audio can be reinforced by the multiple near-end loudspeakers.

To efficiently distribute processing among the near-end conferencing devices, each non-primary conferencing device processes its microphone signal or signals before transmitting it to the primary device. The processing at each conferencing device is performed in the frequency domain. Operating in the frequency domain results in less computationally intensive operations than if done in the time domain. Further, transmitting the processed audio signals that are encoded in the frequency domain results in a smaller delay for the entire microphone processing operations than if the audio signals were encoded into the time domain at the non-primary conferencing device and then decoded at the next processing operation in the primary conferencing device. The conferencing system improves sound quality at the far-end by reducing the delay between the instant near-end voice signals are captured by the microphones and the instant they are transmitted to the far-end.

Each near-end conferencing device performs signal conditioning on the captured audio signal before transmitting the frequency domain audio signal to the primary conferencing device. The signal conditioning can include echo cancellation, noise reduction, amplification, etc. Each non-primary conferencing device is adapted to transmit side-information data such as noise floor, echo-return loss, etc. in addition to the frequency domain audio signal to the primary conferencing device. The near-end conferencing devices can perform time-domain to frequency domain conversion using analysis filter banks. The frequency domain encoding can be performed using sub-band transformation.

In certain other preferred embodiments each near-end conferencing device is adapted to be connected to external communication devices, such as cell phones, laptop computers with VOIP capability, etc. The conferencing system is adapted to allow every far-end device to hear all other far-end devices in addition to the near-end microphone mix signal. Each near-end conferencing device performs premixing of the incoming far-end audio signals of the connected external communication devices. This premixed signal is transmitted from each conferencing device to every other conferencing device in the daisy-chain. In addition, each conferencing device selectively mixes the premixed audio signals received from other conferencing devices, the microphone mix audio signal provided by the primary conferencing device, and selected incoming far-end audio signals of the connected external communication devices to generate outgoing far-end audio signals for each of the external communication devices connected to the conferencing device.

BRIEF DESCRIPTION OF THE DRAWINGS

Exemplary embodiments of the present invention will be more readily understood from reading the following description and by reference to the accompanying drawings, in which.

DETAILED DESCRIPTION

Figure 1:
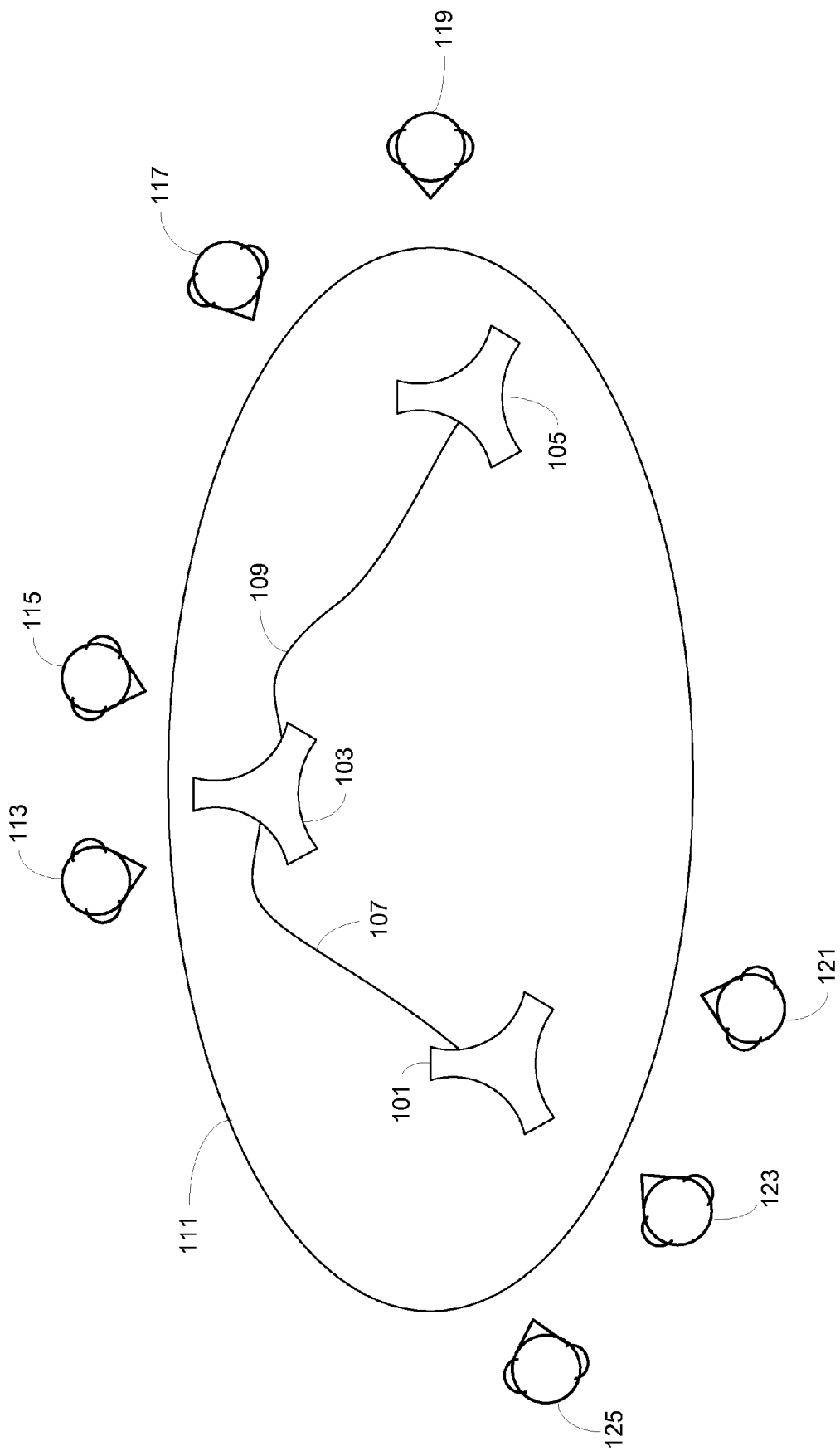
FIG. 1 illustrates an example for the spatial distribution of three daisy chained conferencing devices in a conference room according to the present invention.

FIG. 1 illustrates three conferencing devices serially linked i.e., daisy-chained. Conferencing devices 101, 103, and 105 are interconnected in a daisy-chained manner. Conferencing device 101 is electrically connected, via cable 107, to conferencing device 103, which in turn is electrically connected to conferencing device 105 via cable 109. Alternatively, the conferencing devices 101, 103 and 105 can communicate over wireless connections, e.g., RF, BLUETOOTH®, etc. All the conferencing devices are placed on a conference table 111, although multiple tables may be used. Near-end participants 113-125 gather around the table 111 to engage in a meeting with each other and one or more far-end participants through the conferencing devices 101, 103, and 105. The distribution of the near-end participants 113-125 around the table 111 is non-uniform. In the shown setup, each conferencing device 101, 103, and 105 is placed proximal to a near-end participant or a group of near-end participants. For example, conferencing device 101 is placed in close proximity to near-end participants 121-125, and conferencing device 105 is placed in close proximity to near-end participants 117 and 119.

The number and location of the conferencing devices, relative to the distribution of the near-end participants and relative to each other is not limited to the one shown in FIG. 1. Depending upon the number of near-end participants and their distribution in the room or auditorium, the number of conferencing devices and their positions may be selected to optimize the sound pickup quality. For example, the conferencing system may include two or more conferencing devices.

One approach to reducing room reverberation is to reduce the maximum distance between the sound source and the receiver. As shown in the example illustrated in FIG. 1, multiple conferencing devices 101, 103, and 105, distributed appropriately within the conference room can reduce the aural artifacts introduced by reverberation. How long the perceptible effects of reverberation last is dependent, at least, on the amplitude of the source sound. When the distance between the near-end participant and the conferencing device is reduced, the near-end participant does not need to shout so as to be effectively heard by the far-end participants. Because the near-end participant can now talk relatively softly, the amplitude of his/her voice signal is also relatively lower. The lower source amplitude reduces the time for which reverberation perceptibly lasts, and consequently reducing the undesirable effects of reverberation. Even in cases where the conferencing devices may include an automatic gain control (AGC) such that the near-end participant need not speak very loudly to be effectively heard by the far-end participants, the inclusion of AGC may itself boost the effects of reverberation. Therefore despite inclusion of AGC, it is still advantageous to reduce the distance between the receiver and the sound source.

Each conferencing device produces audio output signals developed in a conventional manner from each of the internal microphones, of which there are preferably three. The availability of multiple audio signals from multiple spatial locations allows for various mixing options not available with single conferencing device setups. For example, referring to the illustration depicted in FIG. 1, with only a single conferencing device 103 being operational, the audio signal level corresponding to the voice of one near-end participant, say 123, may be weaker than the audio signal level corresponding to another near-end participant, say 115. As a result, the relative audio signal levels of the two near-end participants, 123 and 115, are fixed. If however, multiple conferencing devices 101, 103, and 105 are operational, as depicted in FIG. 1, then the audio signal corresponding to near-end participant 115 can be selected from the microphone on conferencing device 103 while the audio signal corresponding to near-end participant 123 can be selected from a microphone on conferencing device 101. This results in the audio signals corresponding to the near-end participants 115 and 123 being independent of each other—allowing amplification or attenuation (or, in general, conditioning) of the audio signal received corresponding to near-end participant 123 without affecting the audio signal corresponding to near-end participant 115. When these audio signals are mixed and transmitted to the far-end, the playback at the far-end can have equal sound levels for near-end participants 115 and 123. In cases where multiple mics are employed in each conferencing device, AGCs may be used to equalize the audio signals corresponding to the near-end participants reaching each conferencing device. However, there is an upper limit to the amount of gain an AGC can offer, and therefore it is always advantageous to pick up the sound of the near-end participant from a mic on a conferencing device that is nearest to the near-end participant.

An additional advantage of the setup illustrated in FIG. 1 is that the audio received from the far-end is reinforced by the multiple near-end loudspeakers. Referring to FIG. 1, the audio signal received from the far-end is simultaneously distributed to each of the conferencing devices 101, 103, and 105. Therefore, the maximum distance between any near-end participant and a loudspeaker is reduced. As a result, the far-end sound can be heard more clearly as compared to the case where only one conferencing device is employed. Also, the situation is avoided in which the participants nearer to the loudspeaker may feel discomfort due to the higher volume set to allow participants farther away from the loudspeaker to hear clearly. The availability of multiple loudspeaker sources by virtue of having multiple daisy-chained conferencing devices, allows flexibility in the spatial distribution of the loudspeakers such that the intensity of the far-end sound heard by each near-end participant is optimal.

In addition to the example described above, multiple audio pickup and loudspeaker devices placed at multiple positions in a conference room allows for various sophisticated sound distribution and mixing techniques to be employed. These techniques include positional audio, where the relative spatial location of the speakers is detected and the reproduced audio reflects these spatial locations; provision of the individual microphone signals for each microphone in each conferencing device to the primary device for mixing using all or a select subset of all of the individual microphone signals; active noise cancellation, where one of the mics is used as a reference mic and is pointed to the strongest noise source, and the other mics use the signal generated by the reference mic to subtract noise from their associated audio signals; beamforming for better reverberation, noise reduction, and allowing one participant or a group of participant to select sound quality settings independent of the sound quality settings of other participants; etc.

Figure 2:
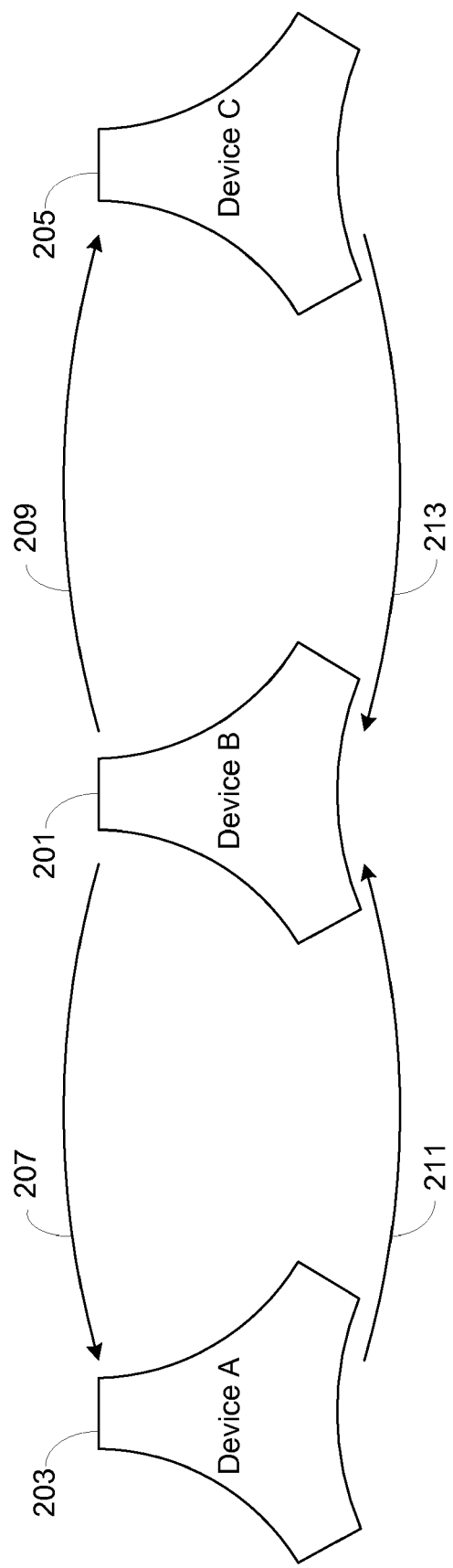
FIG. 2 is a schematic depicting inter-device signaling according to the present invention.

FIG. 2 depicts the signal flow between three daisy-chained conferencing devices in accordance with an embodiment of the present invention. In the embodiment shown in FIG. 2, the conferencing device B 201 is the exemplary primary device for purposes of illustration. The primary device directly communicates with the far-end conferencing device. Alternately, device A 203 or device C 205 may be the one directly communicating with the far-end device. The primary device mixes the microphone signals received from each of the non-primary devices (Device A 203 and Device C 205) with its own microphone signal, and transmits the mixed microphone signal to the far-end. The primary device B 201 also receives a far-end signal from the far-end, develops a loudspeaker signal from the far-end signal, and transmits the loudspeaker signal to each non-primary device (Device A 203 and Device C 205).

The position of the primary device is not limited to the one shown in FIG. 2. For example, either device A 203 or device C 205 may also serve as a primary conferencing device. In case device A 203 is designated as the primary device, device C 205 transmits its audio signal to device B 201. Device B 201 transmits its own audio signal and also the audio signal of device C 205 (with a negligible delay) to device A 203. Device A 203 then mixes the audio signals received from device B 201 and device C 205 with its own audio signal, and transmits the mixed audio signal to the far-end conferencing device.

Conventional conferencing devices transmit their outgoing audio signals in the time domain. In a daisy chain configuration, N devices are connected in series. Typically, only one of the N conferencing devices is directly connected to the far-end. As a result, for N conventional conferencing devices connected in a daisy chained configuration, N−1 devices will transmit their audio signals, in time domain, to the one conferencing device (denoted by "the Nth device") that is connected to the far-end. The Nth device then processes N audio signals (N−1 audio signals from N−1 devices, and one audio signal of its own) and transmits the resultant audio signal to the far-side. The processing includes, at least, mixing the N audio signals into a single audio signal, but may also include conditioning such as echo cancellation, noise reduction, amplification, etc. being carried out on each of the N received audio signals.

Referring again to FIG. 2, to efficiently distribute processing among the multiple conferencing devices, devices A 203 and C 205 perform acoustic signal processing (ASP) on their respective microphone signals, and subsequently transmit the processed microphone signals 211 and 213 to the primary device B 201. However, before the ASP is performed, the microphone signals are converted from time domain to frequency domain. For example, a time domain microphone signal may be sampled at 48 kHz and then transformed into a frequency domain signal by an analysis filter bank. Therefore the microphone signals are transmitted to the primary device in the frequency domain after being processed. In addition, performing ASP on signals in frequency domain requires less computationally intensive operations than required for performing ASP on signals in time domain. As shown in FIG. 2, device A 203 and device C 205 transmit processed microphone signals 211 and 213 in the frequency domain to the primary device B 201 for mixing. In the other direction, device B 201 transmits the loudspeaker audio signal received from the far-end to device A 203 (signal 207) and device C 205 (signal 209) in the time domain. Device B 201 ensures that the loudspeaker audio signal arrive at the loudspeakers of each device simultaneously.

Figure 3:
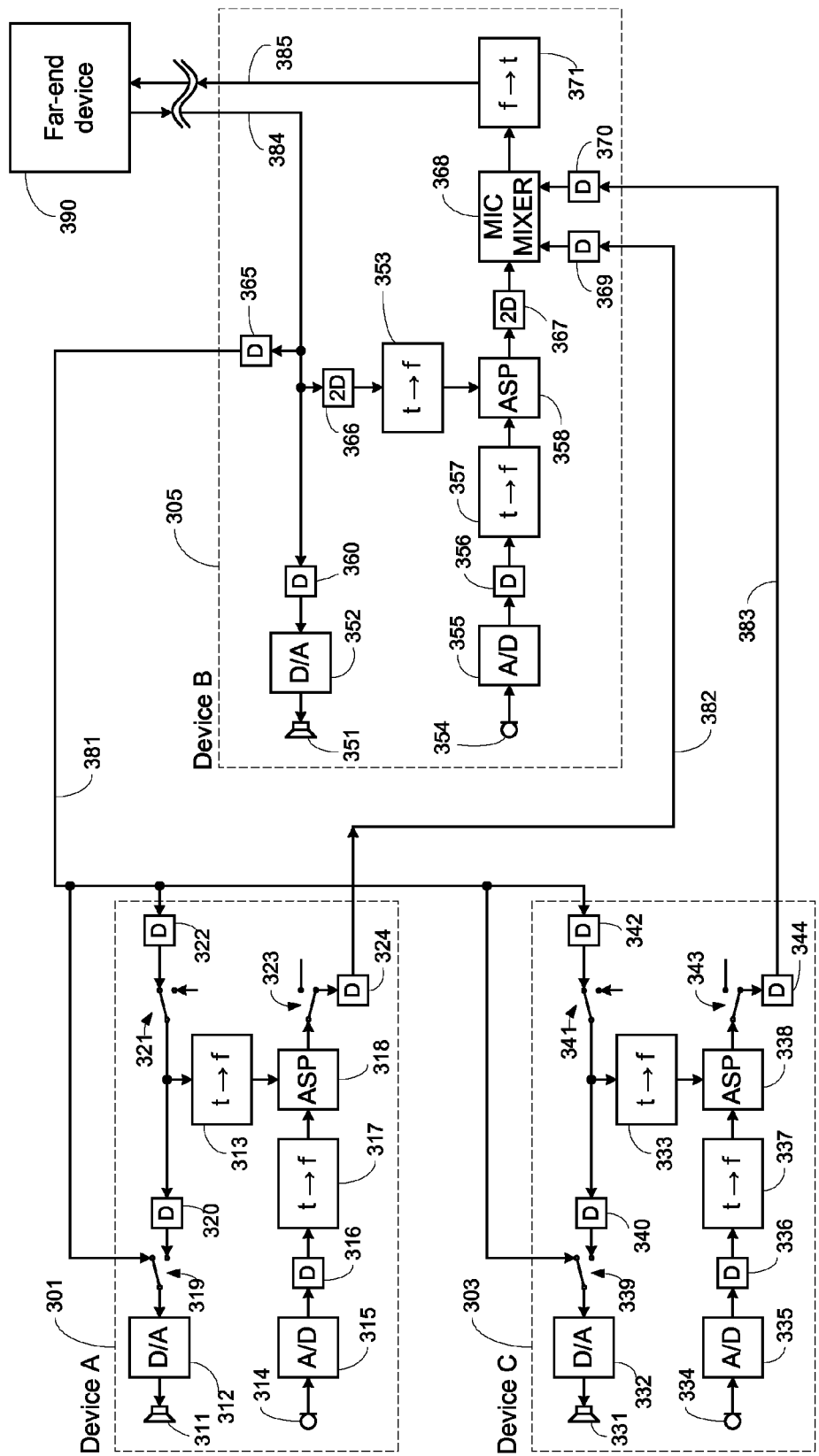
FIG. 3 shows a functional block diagram of three conferencing devices connected in a daisy chain manner according to the present invention.

FIG. 3 illustrates the block diagram of three conferencing daisy-chained devices A, B, and C. Device A 301, device B 305, and device C 303 are interconnected in a daisy-chain configuration. Specifically, device A 301 is connected to device B 305, which in turn is connected to device C 303. Microphone signals are transmitted from device A 301 and device C 303 via interconnects 383 and 382, respectively, while the loudspeaker signal is transmitted from device B 305 to both device A 301 and device C 303 via interconnect 381. Each device A 301, B 305, and C 303 includes input/output ports (not shown) to allow communication over interconnects. The nature of the input/output ports depends upon the type of interconnects used. For example, if the device A 301 and device B 305 communicate with each other via a wireless interconnect 383, then the input/output port can be a wireless port. Device B 305 communicates with the far-end device 390 by transmitting the microphone mixed signal via interconnect 385 and receives far-end loudspeaker signal via interconnect 384. The interconnects may be high speed links such as disclosed in U.S. Application Publication Ser. No. 11/123,765, filed May 6, 2005, entitled "A Method and Apparatus for Combining Speakerphone and Video Conference Unit Operations", which is hereby incorporated by reference, a proprietary interface, or various standard interfaces such as Ethernet. Device B 305 may communicate with the far-end device through Ethernet, ISDN, POTS, Fiber-optics, etc.

Device A 301 includes a microphone 314 and a loudspeaker 311. The microphone converts sound energy corresponding to the voice signals of the near-end participants into electrical audio signals. The loudspeaker 311 converts loudspeaker signals received from device B 305 into sound. The audio signal from the microphone 314 is fed to an analog-to-digital (A/D) converter 315. The A/D converter 315 converts the analog audio signal generated by the microphone 314 into a digital signal that is discrete in time and amplitude. This digital signal is delayed by a delay D indicated by reference number 316. Delay D is representative of the time used for direct memory access (DMA)—a standard mechanism for transferring data blocks between A/D converter and the processor memory. The delay D may be a function of the size of the data blocks being transferred. The digital signal output of the A/D converter 315 is in the time domain. The analysis filter bank 317 converts the digital signal from time domain to an equivalent frequency domain representation. The analysis filter bank 317 divides the signal spectrum into frequency sub-bands and generates a time-indexed series of coefficients representing the frequency localized signal power within each band. This representation of the signal in the frequency domain is fed to the acoustic signal processor (ASP) 318 for signal conditioning and manipulation like echo cancellation, suppression, noise reduction, etc. The ASP 318 then transmits the processed signal to the microphone mixer 368 of device B 305 via signal line 382 to be mixed with the corresponding signal from device C 303.

Although the embodiment shown in FIG. 3 describes only one microphone per device, the number of microphones associated with each conferencing device may be more than one. For example, any or all of the conferencing devices A 301, B 305, and C 303 may have three microphones for capturing the voice of the local participants. In cases where a non-primary conferencing device (e.g., device A 301 and device C 303 in FIG. 3) includes more than one microphone, a non-primary conferencing device may process the audio signal generated by each of its microphone and then transmit all the processed audio signals to the primary device. In such cases the primary device may select one or more the received microphones (in addition to selecting from the audio signals generated by the primary device's own microphones) and mix the selected audio signals to generate a near-end audio signal. Alternatively, a non-primary device may select the audio signals of one or more of the microphones and send only one audio signal to the primary conferencing device.

Device A 301 receives a time domain far-end audio signal from device B 305 via signal line 381. This audio signal is received by device A 301 at two points: one at the input of the switch 321 (after a direct memory access (DMA) delay D, represented by reference 322, for data transfer between the input/output port controller and the processor memory); and second at the input of the switch 319. The audio signal fed directly to the digital to analog (D/A) converter 312 that converts the digital audio signal to an analog audio signal. This analog audio signal is fed to the loudspeaker 311, which, in turn, converts the analog audio signal into sound. The audio signal at the input of the switch 321 is fed to an analysis filter bank 313. The output of the analysis filter bank 313 is fed to the ASP 318. The analysis filter bank 313 is configured similar to the analysis filter bank 317. The filter bank 313 converts the loudspeaker audio signal from time domain to frequency domain. This frequency domain representation is then fed to the ASP 318 for echo cancellation. The ASP 318 carries out the echo cancellation in the frequency domain by subtracting the loudspeaker signal from the microphone audio signal. The ASP 318 also carries out residual echo suppression, noise reduction, etc. The output of the ASP—the processed frequency domain device A 301 microphone signal—is fed to the mic mixer block 368 of device B 305. This processed frequency domain microphone signal encounters delays because of DMA access of data between the input/output port controller and the processor memory, as shown by reference number 344.

The architecture of device C 303 shown in FIG. 3 is similar to device A 301 described above. Similar to device A 301, device C 303 receives the far-end loudspeaker audio signal from device B 305 via signal line 381. This audio signal is fed to the D/A converter 332, which converts it from digital into an analog audio signal and feeds it to the loudspeaker 331. The output of the ASP 338 is fed to the mic mixer block 368 of device B 305 via signal line 383. The output of the ASP 338 is shown to be delayed by DMA delay D by reference number 344.

Device B 305 is the primary device in the daisy-chain formed by devices A 301, B 305, and C 303. The primary device is the device that is communicatively connected to the far-end conferencing device in most instances. However, the far-end conferencing device can be connected to any one of the conferencing devices in the daisy chain. In such cases, the primary device, despite not being directly connected to the far-end conferencing device, may still carry out the mixing of the microphone audio signals and generate the near-end mic-mix signal. As shown in FIG. 3, device B 305 communicates with the far-end device 390 via signals 384 and 385 and receives audio signals from far-end device 390 representing the voice signals of the far-end participants. On the other hand device B 305 transmits the audio signal representing the voice signals of near-end participants over signal line 385. Note that the signal lines 384 and 385, as shown in FIG. 3, may not reflect the actual implementation of the physical communication between the primary device B 305 and the far-end device 390. The physical implementation may be in any form that is sufficient to allow communication between the two devices, for example, Ethernet, fiber optics, wireless, etc.

Device B 305 receives processed microphone signals from device A 301 and device C 303 via signal lines 382 and 383, respectively. After being delayed by the DMA delay represented by reference numbers 369 and 370, the microphone signals are fed to the mic mixer block 368. Note that the audio signal generated by the microphone 354 of device B 305 is processed in the same manner described above for device A 301. However, in device B 305, the processed audio signal (which is in the frequency domain) is delayed by a delay of 2D by delay block 367 before being fed to the mic mixer 368. This 2D delay ensures that the microphone signals from each of the devices A, B, and C, are delayed by the same amount before being mixed. The output of the mixer 368 is fed to the synthesis filter bank 371 that converts the audio signal from frequency domain to time domain. The time domain audio signal is transmitted to the far-end device 390 via signal line 385.

The A/D converters 315, 355, and 335 of devices A 301, B 305, and C 303, respectively, sample the analog time domain signal at their input at a sampling rate of 48 kHz. Note that the sampling frequency is not limited to 48 kHz. Depending upon the highest audio frequency to be reproduced, the sampling frequency is set at least to twice the audio signal bandwidth. The A/D converters comprise of an analog preamplifier, a sample and hold circuit, a quantizer, and an encoder. The A/D converter may employ oversampling to reduce the resolution requirements on the quantizer. The A/D converters may be of any of the following type: direct conversion, successive approximation, sigma-delta, and other well known types known in the art.

The analysis filter banks shown in FIG. 3 (317 and 313 in device A 301, 337 and 333 in device C 303, and 357 and 353 in device B) divide the input signal spectrum into frequency sub-bands and generate a time-indexed series of coefficients representing the frequency localized signal power within each band. This is achieved by inputting the time domain digital audio signal to a parallel bank of bandpass filters, where the bandwidth of each bandpass filter may overlap with the bandwidth of the other filters, and where the cumulative bandwidth of all the bandpass filters includes the desired input signal bandwidth. The output of each of the bandpass filters is then transformed into the frequency domain using fast Fourier transform (FFT), for example. Each of the analysis filter banks shown in FIG. 3 use 480 separate bandpass filters. However, the number of sub-bands generated by the analysis filter bank is not limited to 480. The number of sub-bands is, at least in part, a function of the desired frequency resolution, where the frequency resolution increases with an increase in the number of sub-bands.

The time to frequency domain conversion of the microphone signals may also be carried out using various other time-to-frequency conversion methods known in the art. For example, a single FFT conversion module may be employed which generates a stream of time-indexed coefficients representing the frequency localized signal power within the whole signal spectrum. Similarly, the frequency to time domain conversion of the mixed near-end audio signal is not limited to using the synthesis filter bank method. Any method known the art for converting frequency domain signals to time domain signals may be employed. Typically, the frequency to time domain conversion module complements the time to frequency domain module.

Processing audio signals in the frequency domain is computationally less intensive as compared to processing the signals in the time domain for echo cancellation. For example, the processor, at any given time, can receive N samples of time domain signals, each sample being represented by L coefficients. This results in N times L, or NL, number of computations. When the time domain signals are transformed to the frequency domain using analysis filter banks with M sub-bands with critical sampling, each sub-band processes N/M samples of data. Further, the number of coefficients in each band is equal to L/M. Therefore the computations carried by each band is equal to (N/M)(L/M). And the total number of computations carried out be all the M sub-bands is (N/M)(L/M)M, or (NL)/M. This shows that the sub-band frequency domain approach performs better than the time domain approach by a factor of M. In cases where the time domain signal may be oversampled by a factor A, the performance improvement is by a factor of $A^2/M$.

In the embodiment shown in FIG. 3, any one of the conferencing devices A 301, B 305, or C 303 may be configured to function as a primary conferencing device. Some components in each device that allow reconfiguration from primary to non-primary and vice versa have not been shown only to preserve clarity of illustration. For example, devices A 301 and C 303 also include mic mixers, synthesis filter banks, input/output ports to communicate with far-end devices, etc. By reconfiguring selected switches (e.g., switches 319, 339, 321, 341, 323, 343, and other switches not shown in device B 305) in the conferencing device, the function of the devices can be changed between primary and non-primary. The reconfiguration may be carried out entirely by software, entirely by hardware, or by a combination of both.

The acoustic signal processors (ASPs) shown in FIG. 3 (318 of device A 301, 358 of device B 305, and 338 of device C 303), is a signal processing module used, among other tasks, for acoustic echo cancellation. When the leading edge of a reflected sound wave arrives a few tenths of milliseconds after the direct sound wave, we hear an echo. Such echoes are annoying, and under extreme conditions can completely disrupt a conversation. For example, a near-side microphone will pick up the voice of the far-end participant from the loudspeaker and subsequent reflections. In the absence of any correction circuit, the audio signal generated by the microphone will be transmitted back to the far-end participant's loudspeaker. As a result, if the round trip time for the audio signal is greater than a few tenths of milliseconds, the far-end participant will hear his own voice in the form of an echo. The ASP processes the microphone signal such that the loudspeaker sound is suppressed before the microphone signal is transmitted to the far-end. Usually, an adaptive filter is employed that samples the loudspeaker signal and generates a synthetic audio signal that is as close to the one generated by the conference room.

Figure 4:
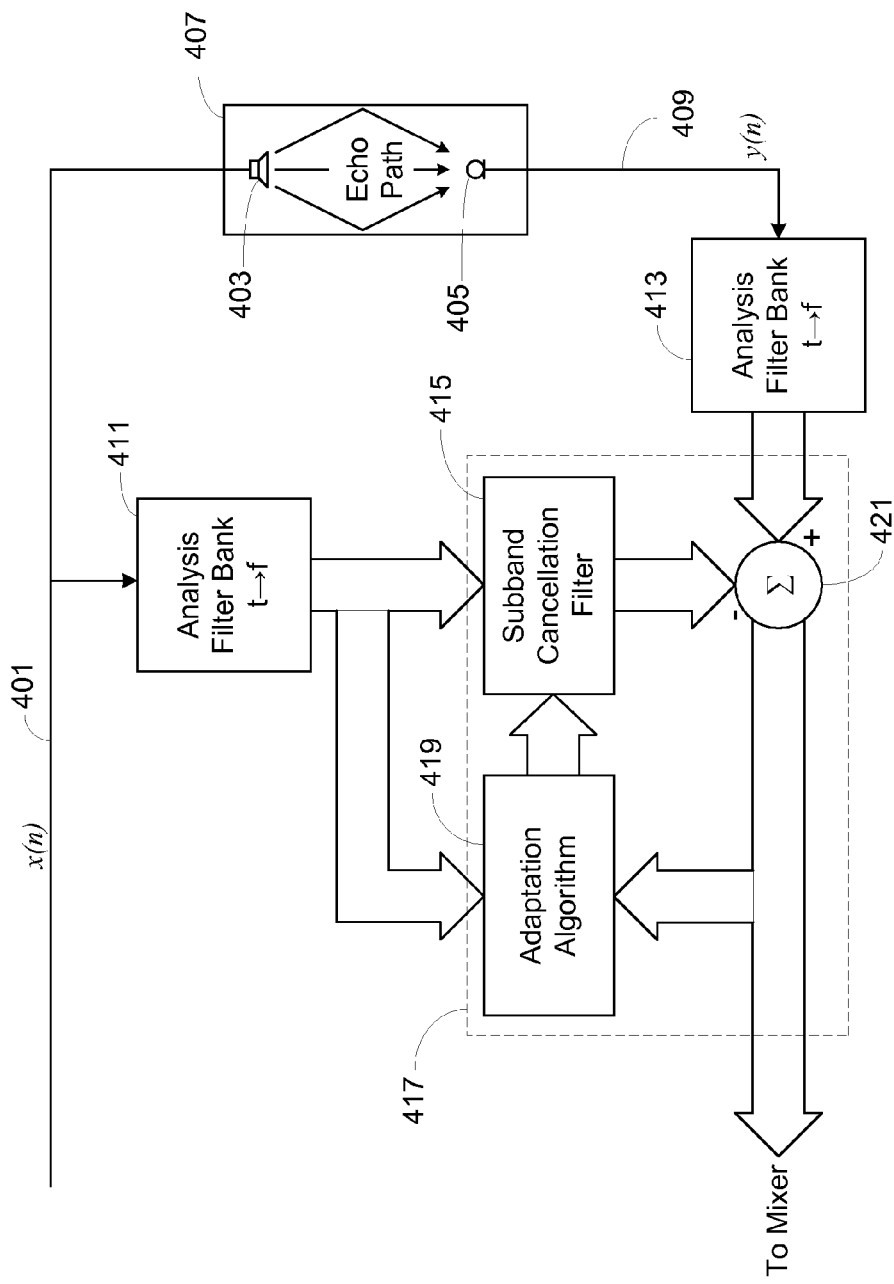
FIG. 4 shows a functional block diagram of an acoustic echo canceller according to the present invention.

The ASPs shown in FIG. 3 perform echo cancellation in the frequency domain. FIG. 4 shows a schematic for acoustic echo cancellation in accordance with an embodiment of the present invention. The loudspeaker signal x(n) 401 is fed to the loudspeaker 403. The microphone 405 picks up the sound from the loudspeaker 403 in addition to the voice signals reflected from various surfaces within the conference room 407 to generate the microphone output y(n) 409. Note that both x(n) 401 and y(n) 409 are time domain digital signals—the conversion blocks (A/D converter and D/A converter) are not shown for clarity. The loudspeaker signal x(n) 401 and the microphone output y(n) 409 are fed to analysis filter banks 411 and 413, respectively. Typically, the analysis filter banks process a block of L of their respective input signals. The outputs of the analysis banks are fed to the audio signal processor ASP 417. The block arrows indicate that the signals are in sub-band form and in the frequency domain. The echo cancellation portion of the ASP 417 comprises a sub-band cancellation filter 415, an adaptation algorithm 419, and a summing block 421. The sub-band cancellation filter modifies the signal received from the analysis filter bank 411 to generate an approximate signal corresponding to the sub-band echo signals embedded in y(n) 409. The modified signal is then subtracted from the output of the analysis filter bank 413 to generate an error signal. The adaptation algorithm utilizes the sub-band error signals and the input signals to adjust the transfer function of the sub-band cancellation filter such that the error signal converges to a desired minimum.

The acoustic characteristics of the conference room 407 depends, in part, on the volume, surface area, and the absorption coefficient of the room surfaces. However, the acoustic characteristics of the room 407 are dynamic in nature. For example, the echo characteristics of the room may change with the change with the movement of near-end participants. This may directly impact the length of the echo captured by the microphone 405. To effectively suppress the echo signal under such dynamic acoustic conditions, the adaptive algorithm constantly monitors the error signal and appropriately modifies the coefficients of the sub-band cancellation filter such that the error signal converges to a desired minimum.

The ASP 417 is not limited to the functional blocks shown in FIG. 4. The ASP 417 can also include various other signal conditioning blocks, e.g., noise reduction, signal amplification, buffering, etc. Further, the ASPs may also transmit side information (from non-primary device to the primary device) data that includes measures such as noise floor, echo-return-loss, etc. For example, referring to FIG. 3, ASPs of the non-primary devices A 301 and C 303 may transmit the side information along with the frequency domain audio signal to the mic mixer 368 in device B 305. The mic mixer 368 may utilize the side information associated with each incoming audio signal to appropriately adjust its mixing parameters.

Figure 5:
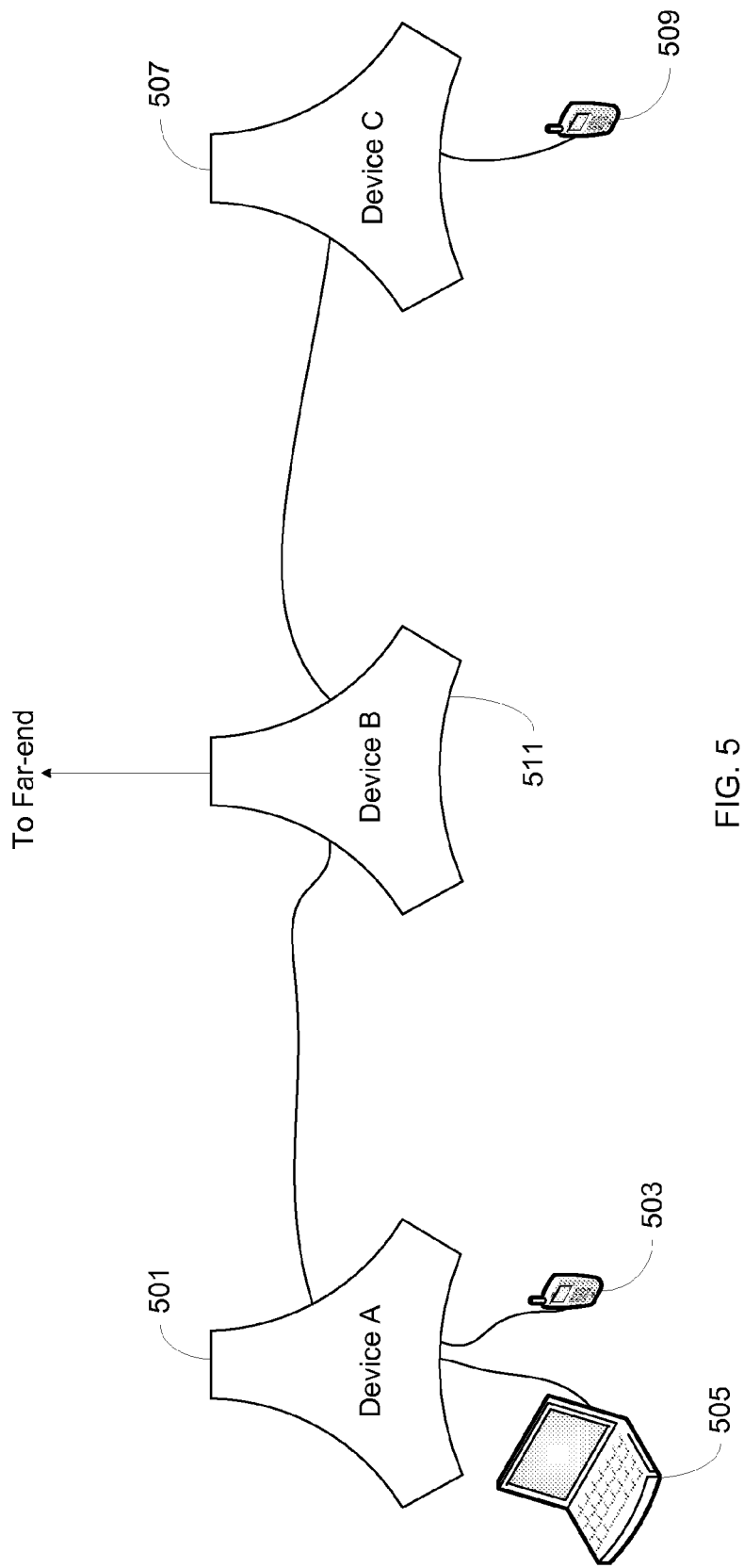
FIG. 5 shows daisy chained conferencing devices supporting multiple external communication devices according to the present invention.

FIG. 5 depicts an embodiment where the daisy-chained conferencing devices provide connectivity to external communication devices such as mobile phones and laptops. Devices A 501 provides connectivity to a mobile phone 503 and a laptop 505. Device C 507 provides additional connectivity to a mobile phone 509. The external devices can be connected to the conferencing devices via industry standard connecting means. For example, laptop 505 may be connected to device A 501 via USB, while the mobile phones 503 and 509 may be connected to the devices A 501 and C 507 via 2.5 mm jacks. The external communication devices may also communicate with the conferencing devices via BLUETOOTH®. Although not shown, device B 511 may also connect to a number of external communication devices. The external devices may also include far-end devices located at remote locations, such as telephones and other conferencing devices and may be connected using POTS lines, VoIP, cellular and the like.

In addition, each external communication device connected to any of the conferencing devices can fully participate in the conference call. For example, a far-end participant connected to the laptop 505 via VOIP (voice over IP) can communicate with the far-end participant of the mobile phone 509. In addition, the far-end participant of each of the external communication devices can also hear the microphone mix signal generated by the primary device B 511.

Figure 6:
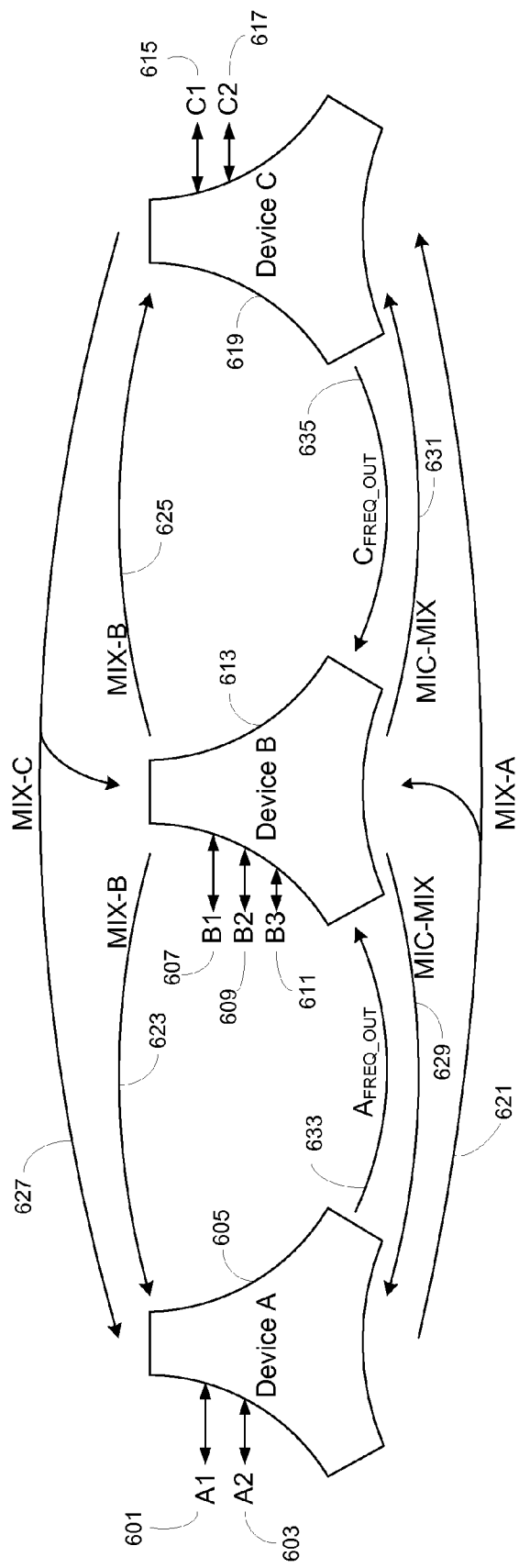
FIG. 6 shows a signal flow diagram of the daisy chained conferencing devices configured as a distributed bridge and supporting multiple communication devices according to the present invention.

FIG. 6 depicts conferencing devices connected in a daisy-chained manner, illustrating the signal flow between the devices when each device provides connectivity to one or more external communication devices. FIG. 6 shows external communication devices A1 601 and A2 603 connected to conferencing device A 605; communication devices B1 607, B2 609, and B3 611 connected to conferencing device B 613; and communication devices C1 615 and C2 617 connected to conferencing device C 619. The external communication devices (A1 601, A2 603, B1 607, B2 609, B3 611, C1 615, and C2 617) may include mobile phone, a laptop computer, conventional telephone, or any other communication device. The external communication devices may be connected to the conferencing devices via Ethernet cable, USB cable, serial link, twisted pair, POTS (plain old telephone service), ISDN (integrated services digital network), or any other connection means that allows full or half duplex signal flow between the communication device and the conferencing device. For example, a laptop computer (e.g., laptop computer 505 in FIG. 5) can be connected to the conferencing device via an USB cable, where the laptop computer carries out VOIP communication with a far-end participant. Furthermore, the external device may also include regular phones, speakerphones or mobile phones connected to the conferencing devices over conventional POTS, IP or cellular connections.

The daisy-chained configuration shown in FIG. 6 can serve as a bridge—allowing connectivity to each of the external communication devices. Every far-end participant on each of the communication devices can hear the far-end participants on all other communication devices. In addition, every far-end participant can hear the associated near-end mixed microphone audio signal. For example, the far-end participant on the communication device A1 601 can hear the far-end participant on the communication device C2 617 in addition to the near-end mixed microphone audio signal generated by the near-end primary device B 613.

The signal flow among the conferencing devices and the signal flow between each conferencing device and the associated external communication devices as exemplified in FIG. 6 is listed in the Table 1, below:

TABLE 1

| DEVICE A | DEVICE B | DEVICE C |
|---|---|---|
| MIX-A = A1IN + A2IN | MIX-B = B1IN + B2IN + B3IN | MIX-C = C1IN + C2IN |
| A1OUT = A2IN + MIX-B + MIX-C + MIC-MIX | B1OUT = B2IN + B3IN + MIX-A + MIX-C + MIC-MIX | C1OUT = C2IN + MIX-A + MIX-B + MIC-MIX |
| A2OUT = A1IN + MIX-B + MIX-C + MIC-MIX | B2OUT = B1IN + B3IN + MIX-A + MIX-C + MIC-MIX | C2OUT = C1IN + MIX-A + MIX-B + MIC-MIX |
| AFREQ_OUT = A microphone in frequency domain. | B3OUT = B1IN + B2IN + MIX-A + MIX-C + MIC-MIX | CFREQ_OUT = C microphone in frequency domain. |

TABLE 1-continued

| DEVICE A | DEVICE B | DEVICE C |
|---|---|---|
| | MIC-MIX = AFREQ_OUT + CFREQ_OUT + B microphone signal in frequency domain. | |

Each conferencing device mixes the incoming far-end audio signals of its associated communication devices, and transmits the mixed signal to all the other conferencing devices in the daisy-chain. For example, in FIG. 6, device A 605 mixes the incoming far-end audio signal from devices A1 601 and A2 603, and transmits the resultant signal MIX-A 621 to device B 613 and device C 619. Similarly, device B 613 transmits MIX-B (623 and 625) to both device A 605 and device C 619, and device C 619 transmits MIX-C 627 to both device A 605 and device B 613. Further, device B 613 transmits the MIC-MIX signal 629 (Refer to signal 385 in FIG. 3) to both device A 605 and device C 619. MIC-MIX forms a component of all outgoing far-end signals to each of the external communication devices. Note that MIC-MIX is generated from mixing mic signals received from device A 605 (AFREQ_OUT 633), device C 619 (CFREQ_OUT 635) and device B 613. The signals AFREQ_OUT 633 and CFREQ_OUT 635 are transmitted to device B 613 in frequency domain, as previously explained with reference to FIG. 3.

While selected signals discussed above have been stated as being time domain or frequency domain for specific transfers, this is only in preferred embodiments. In other embodiments signals such as the mixed far end signals could be provided between devices in the frequency domain rather than the time domain and the MIC-MIX signal could be provided in the time domain instead of the frequency domain.

Figure 7:
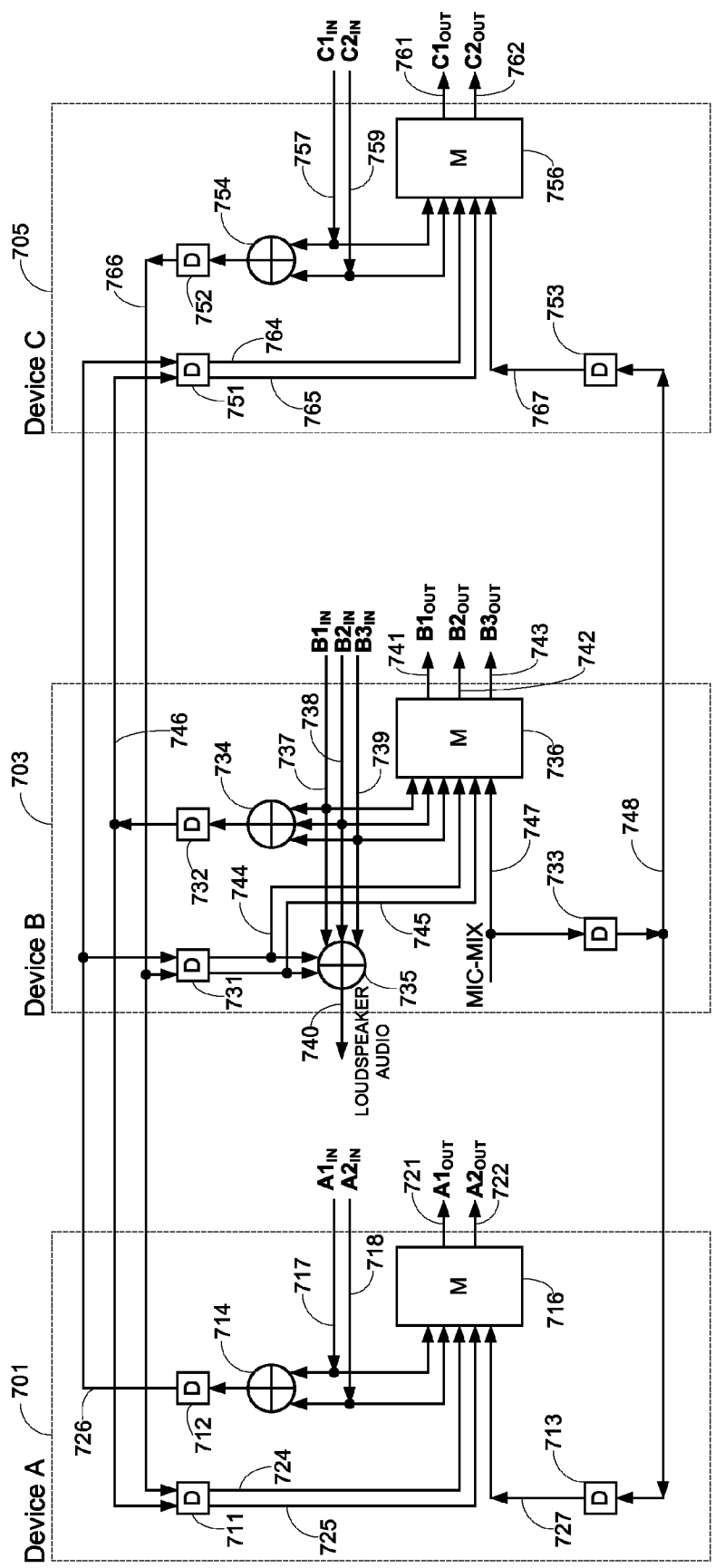
FIG. 7 illustrates a functional block diagram of the distributed bridge of FIG. 6.

FIG. 7 depicts a functional block diagram of the distributed bridge shown in FIG. 6. Each of the conferencing devices A 701, B 703, and C 705 premix the incoming signals from their associated external communication devices. For example, in device A 701, signals A1IN 717 and A2IN 718 are premixed in the mixer 714 to generate a premixed signal MIX-A 726. Similarly, in Device B 703, signals B1IN 737, B2IN 738, and B3IN 739 are premixed by the mixer 734 to generate the premixed signal MIX-B 746. And in Device C 705, signals C1IN 757 and C2IN 759 are premixed in the mixer 754 to generate a premixed signal MIX-C 766. Each conferencing device broadcasts its premixed signal to every other conferencing device in the daisy-chain. For example, Device A 701 transmits its premixed signal MIX-A 726 to both Device B 703 and Device C 705. Again, the various signals can be provided in time or frequency domain in particular embodiments.

Conferencing Device A 701 receives premixed signals MIX-B 746 and MIX-C 766 from Device B 703 and Device C 705, respectively. The received premixed signals undergo a DMA delay D 711 before being fed to a selective mixer MA 716 via signal lines 724 and 725. The selective mixer MA 716 also receives signals A1IN 717 and A2IN 718. Further, selective mixer MA 716 also receives the MIC-MIX signal 747 (Refer to FIG. 3, signal 385), generated by Device B 703, as an input after a DMA delay D 713 via signal line 727. The selective mixer MA 716 is configured to select one or more of its input signals, mix the selected signals, and output the mixed signal to any one of its outputs. For example, selective mixer MA 716 selects signals MIX-B 725, MIX-C 724, A2IN 718, and MIC-MIX 727, and mixes these signals to generate signal A1OUT 722. Signal A2OUT is the outgoing far-end audio signal of the communication device A1. Note that the selective property of the selective mixer MA 716 prevents the signal A1IN 717 of communication device A1 from being sent back to the communication device A1 as part of the outgoing far-end audio signal. MA 716 also ensures that communication devices A1 and A2 can hear the voice of the far-end participants associated with each external communication device (A2, B1, B2, B3, C1, and C2) in addition to the voice of all near-end participants.

Similarly, conferencing device C 705, receives premixed signals MIX-A 726 and MIX-B 746, which are delayed by DMA delay D 751 and fed to selective mixer MC 756 via signal lines 764 and 765, respectively. The selective mixer MC 756 also receives incoming far-end audio signals C1IN 757 and C2IN 759 from external communication devices C1 and C2 (not shown), respectively. Further, the selective mixer MC 756 receives the MIC-MIX signal 767 from Device B 703. The selective mixer MC 756 generates signals C1OUT 761 and C2OUT 762, which are transmitted to the communication devices C1 and C2, respectively. The mixing operation performed by selective mixer MC 756 is in accordance with the signal equations shown in Table 1 under column labeled Device C.

Conferencing device B 703 receives premixed signals MIX-A 726 and MIX-C 766, which are delayed by DMA delay D 731, and fed to selective mixer MB 736 via signal lines 744 and 745, respectively. The selective mixer MB 736 also receives incoming far-end audio signals B1IN 737, B2IN 738, and B3IN 739 from external communication devices B1, B2, and B3, respectively. Further, the selective mixer MB 736 also receives the MIC-MIX signal 747. The selective mixer MB 736 generates signals B1OUT 741, B2OUT 742, and B3OUT 743, which are transmitted to the communication devices B1, B2 and B3, respectively. The mixing operation performed by the selective mixer MB 736 is in accordance with the signal equations shown in Table 1 under column labeled Device B.

Conferencing device B 703 also includes mixer 735 that mixes the premix signals MIX-A 726 and MIX-C 766 with the incoming far-end audio signals of communication devices B1, B2 and B3 to generate a loudspeaker signal 740, which is transmitted to the loudspeaker of each conferencing device in the daisy-chain. This ensures that the voice of far-end participants associated with each of the communication devices can be heard by the near-end participants.

Each audio signal shown in FIG. 6 and FIG. 7 can be represented in the time domain or the frequency domain. The incoming audio signals from the external communication devices can be either in frequency domain or in time domain.

The signal processing described in FIG. 6 and FIG. 7 may be carried out in the time domain, or in the frequency domain. Also, certain portions of the processing may be carried out in time domain while other portions may be carried out in frequency domain, with appropriate conversion interface circuits/programs. For example, in FIG. 7, the mixers 714, 734, 735, and 754 may include analysis filter banks to convert the each of the incoming audio signals to frequency domain before being mixed and transmitted to other conferencing devices. Similarly, the selective mixers MA 716, MB 736 and MC 756 may include synthesis filter banks to convert the mixed signals into time domain before transmitting them to the communication devices. The configuration also provides the option of selecting the domain in which the processing should be performed.

The mixing carried out by each communication device A 605, B 613, and C 619 may utilize conventional bridge mixing. In other words, the devices may use gated mixing, in which the device may select a subset of all incoming signals for mixing. For example, device B 613 may select only one microphone (e.g., a microphone belonging to device C 619) and generate the MIC-MIX signal. Furthermore, conferencing devices A 605 and C 619 may each select the output of one or more mic belonging to the respective devices for transmission to the primary device B 613. The selection may be based on a number of criteria, such as mic signal level, priority assigned to the mic, user selection, etc.

While the preferred embodiment uses analysis filter banks to perform the time domain to frequency domain transform, other transforms such as Lapped Transform, Walsh-Hadamard transform (DWHT), (Discrete) Hartley transform, Discrete Laguerre transform and Discrete Wavelet Transform could be used.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A conferencing system for communicating audio information between a near-end location and a far-end conferencing device at a far-end location, the conferencing system comprising:
    a primary conferencing device; and
    at least one non-primary conferencing devices communicably coupled to the primary conferencing device,
    wherein each of the at least one non-primary conferencing devices generates audio signals representative of voices of near-end participants and transmits the generated audio signals to the primary conferencing device in a frequency domain,
    wherein one of the primary conferencing device and the at least one non-primary conferencing devices is communicably coupled to the far-end conferencing device,
    wherein the primary conferencing device is configured to mix a frequency domain audio signal generated by the primary conferencing device with the generated audio signals received in the frequency domain from each of the at least one non-primary conferencing devices and generate a frequency domain near-end audio signal, and
    wherein the primary conferencing device is configured to convert the frequency domain near-end audio signal to a time domain near-end audio signal and provide the time domain near-end audio signal for transmission to the far-end conferencing device.

2. The conferencing system of claim 1, wherein a loudspeaker signal received from the far-end conferencing device is transmitted in the time domain to the primary device and to each of at least one non-primary conferencing devices.

3. The conferencing system of claim 2, wherein the loudspeaker signal is delayed such that the primary conferencing device and each of at least one non-primary conferencing devices playback the loudspeaker signal substantially simultaneously.

4. The conferencing system of claim 2, wherein the primary device and each at least one non-primary device perform signal conditioning on their respective generated audio signals.

5. The conferencing system of claim 4, wherein the signal conditioning comprises amplification, acoustic echo cancellation, and noise reduction.

6. The conferencing system of claim 1, wherein the primary conferencing device transmits the time domain near-end audio signal to the far-end conferencing device.

7. The conferencing system of claim 1, wherein the primary conferencing device transmits the time domain near-end audio signal to at least one non-primary conferencing device, which in turn transmits the time domain near-end audio signal to the far-end conferencing device.

8. The conferencing system of claim 1, wherein the audio signals generated by each of at least one non-primary conferencing device are transmitted in frequency domain using sub-band encoding.

9. The conferencing system of claim 1, wherein each non-primary conferencing device transmits side information associated with the generated audio signal.

10. The conferencing system of claim 9, wherein the side information comprises noise floor information and echo-return loss information.

11. The conferencing system of claim 1, wherein the primary conferencing device and the at least one non-primary conferencing device are connected in a daisy chain configuration such that the primary conferencing device is placed at one end of the daisy chain.

12. The conferencing device of claim 1, wherein the primary conferencing device and the at least one non-primary conferencing device are connected in a daisy chain configuration such that the primary conferencing device is placed between two of at least one non-primary conferencing devices.

13. A conferencing device for use with other conferencing devices, the conferencing device comprising:
    a microphone for generating a time domain audio signal representative of voices of near-end participants;
    a first time-to-frequency conversion module for converting the time domain audio signal to a frequency domain audio signal;
    an acoustic signal processor for processing the frequency domain audio signal to generate a processed frequency domain audio signal;
    a local input-output port for communicably connecting to another conferencing device for transmitting the processed frequency domain audio signal to the other conferencing device in the frequency domain;
    a speaker signal input port for receiving a time domain loudspeaker signal; and
    a loudspeaker for converting the time domain loudspeaker signal into sound.

14. The conferencing device of claim 13, wherein the local input-output port and the speaker signal input port are the same port and the time domain loudspeaker signal is received from another conferencing device.

15. The conferencing device of claim 14, further comprising a second time-to-frequency conversion module for converting the time domain loudspeaker signal to a frequency domain loudspeaker signal.

16. The conferencing device of claim 15, wherein the acoustic signal processor uses the frequency domain loudspeaker signal for processing the frequency domain audio signal.

17. The conferencing device of claim 16, wherein the processing comprises amplification, acoustic echo cancellation, and noise reduction.

18. The conferencing device of claim 13, further comprising:
an external input-output port for communicably coupling a far end device,
wherein the external input-output port is the speaker signal input port, and
wherein the time domain loudspeaker signal is received from the far end device.

19. The conferencing device of claim 13, wherein the first time-to-frequency conversion module is an analysis filter bank.

20. A conferencing device for use with other conferencing devices, the conferencing device comprising:
a microphone for generating a time domain audio signal representative of voices of near-end participants;
a first time-to-frequency conversion module for converting the time domain audio signal to a frequency domain audio signal;
an acoustic signal processor for processing the frequency domain audio signal to generate a processed frequency domain audio signal;
at least one local input-output port for communicably connecting to the other near-end conferencing devices and for receiving other processed frequency domain audio signals from each of the other conferencing devices;
a frequency domain mixer for mixing the processed frequency domain audio signal with the other processed frequency domain audio signals to generate a near-end frequency domain audio signal;
a speaker signal input port for receiving a time domain loudspeaker signal; and
a loudspeaker for converting the time domain loudspeaker signal into sound.

21. The conferencing device of claim 20, further comprising:
an external input-output port for communicably connecting a far end device,
wherein the external input-output port is the speaker signal input port, and
wherein the time domain loudspeaker signal is received from the far end device.

22. The conferencing device of claim 21, further comprising: a second time-to-frequency conversion module for converting the time domain loudspeaker signal to a frequency domain loudspeaker signal.

23. The conferencing device of claim 22, wherein the acoustic signal processor uses the frequency domain loudspeaker signal for processing the frequency domain audio signal.

24. The conferencing device of claim 23, wherein the processing comprises amplification, acoustic echo cancellation, and noise reduction.

25. The conferencing device of claim 20, wherein the local input-output port and the speaker signal input port are the same port and the time domain loudspeaker signal is received from another conferencing device.

26. The conferencing device of claim 20, further comprising:
a frequency-to-time conversion module for converting the near-end frequency domain audio signal to a near-end time domain audio signal, wherein the near-end time domain audio signal is transmitted to the far-end conferencing device.

27. The conferencing device of claim 26, wherein the frequency-to-time conversion module is a synthesis bank.

28. The conferencing device of claim 20, wherein the first time-to-frequency conversion module is an analysis filter bank.

29. A method of operating a conferencing system for communicating audio information between a near-end location and a far-end conferencing device at a far-end location, the conferencing system including a primary conferencing device and at least one non-primary conferencing devices communicably coupled to the primary conferencing device, with one of the primary conferencing device and the at least one non-primary conferencing devices is communicably coupled to the far-end conferencing device the method comprising:
each of the at least one non-primary conferencing devices generating audio signals representative of voices of near-end participants and transmitting the generated audio signals to the primary conferencing device in a frequency domain,
the primary conferencing device mixing a frequency domain audio signal generated by the primary conferencing device with the generated audio signals received in the frequency domain from each of at least one non-primary conferencing devices and generating a frequency domain near-end audio signal, and
the primary conferencing device converting the frequency domain near-end audio signal to a time domain near-end audio signal and providing the time domain near-end audio signal for transmission to the far-end conferencing device.

30. The method of claim 29, further comprising:
the primary conferencing device transmitting the time domain near-end audio signal to the far-end conferencing device.

31. The method of claim 29, further comprising:
the primary conferencing device transmitting the time domain near-end audio signal to at least one non-primary conferencing device; and
the at least one non-primary conferencing in turn transmitting the time domain near-end audio signal to the far-end conferencing device.

32. A method for operating a conferencing device which includes a microphone, an input-output port and a loudspeaker, the method comprising:
generating a time domain audio signal representative of voices of near-end participants;
converting the time domain audio signal to a frequency domain audio signal;
processing the frequency domain audio signal to generate a processed frequency domain audio signal;
transmitting the processed frequency domain audio signal to another conferencing device in the frequency domain;
receiving a time domain loudspeaker signal; and
converting the time domain loudspeaker signal into sound.

33. A method for operating a conferencing device which includes a microphone, at least one input/output port and a loudspeaker, the method comprising:
generating a time domain audio signal representative of voices of near-end participants;
converting the time domain audio signal to a frequency domain audio signal;
processing the frequency domain audio signal to generate a processed frequency domain audio signal;

receiving other processed frequency domain audio signals from each of other conferencing devices;
mixing the processed frequency domain audio signal with the other processed frequency domain audio signals to generate a near-end frequency domain audio signal;
receiving a time domain loudspeaker signal; and
converting the time domain loudspeaker signal into sound.

\* \* \* \* \*